No. 795,845. PATENTED AUG. 1, 1905.
E. A. MULLER.
RESILIENT CONNECTION FOR POWER TRANSMISSION.
APPLICATION FILED JAN. 28, 1905.

2 SHEETS—SHEET 2.

Witnesses:
Joseph R. Gardner
E. H. Jones

Inventor.
Edward A. Muller
per Walter A. Knight
Attorney.

UNITED STATES PATENT OFFICE.

EDWARD A. MULLER, OF MADISONVILLE, OHIO.

RESILIENT CONNECTION FOR POWER TRANSMISSION.

No. 795,845.      Specification of Letters Patent.      Patented Aug. 1, 1905.

Application filed January 28, 1905. Serial No. 243,058.

*To all whom it may concern:*

Be it known that I, EDWARD A. MULLER, a citizen of the United States, residing at Madisonville, in the county of Hamilton and State of Ohio, have invented new and useful Improvements in Resilient Connections for Power Transmission, of which the following is a specification.

This invention relates to an improvement applicable to all classes of mechanism for power transmission.

The object is to provide a slightly-yieldable connection, so that power may be transmitted through such compound member with a steady smooth motion.

Gears in which the rim or plate carrying the gear-teeth is made separate from the member to which it is attached and of which it forms a working part afford one of the most common constructions to which my improvement is applicable.

Lathes, boring-mills, planers, other machine-tools, and machinery of any kind where the work done is taken on suddenly or is in any sense intermittent have an unsteady or chattering action. In machine-tools this has resulted in their cutting hard metal by short jerking movements, which action is commonly spoken of as "chattering." Not only does this produce an uneven-tooled surface, but the constant jarring lessens the life of the machine. Machine-tools equipped with my improvement take an even positive regular cut, producing a smooth surface, and the destructive jarring motion is avoided.

The character and scope of my invention will be more clearly apparent from a description of a particular embodiment thereof illustrated in the accompanying drawings, in which—

Figure 1:
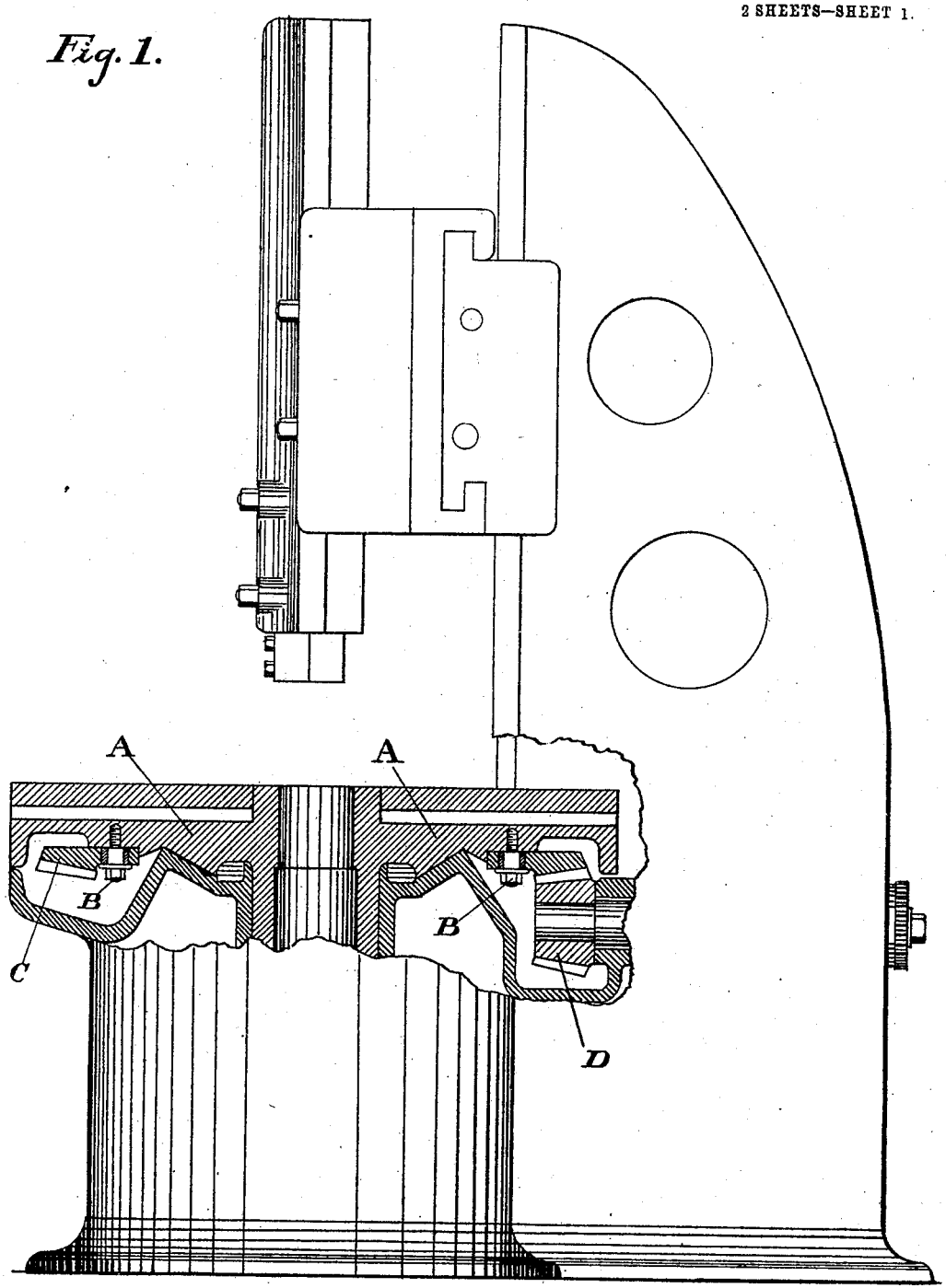
Figure 2:
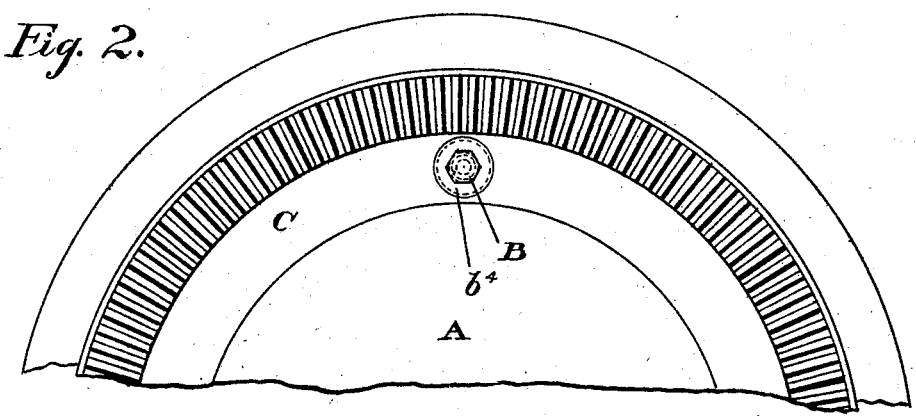
Figure 3:
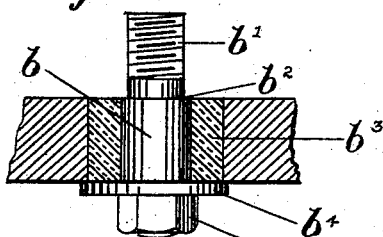
Figure 4:
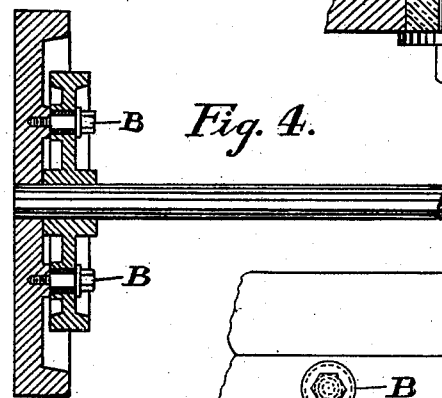
Figure 5:
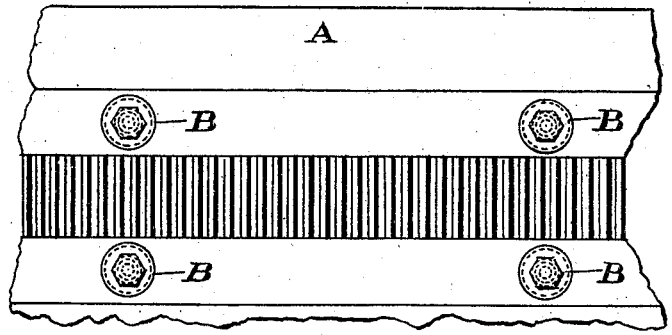

Figure 1 represents a vertical axial section through a boring-mill table and attendant working parts; Fig. 2, a plan view of a part of the under side of a boring-mill table with rim-driven gear and my improved method of attaching the gear to the table; Fig. 3, an enlarged detail of my improvement in section as shown in Fig. 1; Fig. 4, an axial section through a hub-gear, showing my improvement; Fig. 5, my improvement as applied to the toothed rack of a planer.

In a boring-mill including the particular embodiment of the invention herein selected for illustration in Figs. 1, 2, and 3 the table or work-support A has the driven rim-gear C rotatively secured to its under surface by stud-bolts B. These bolts are formed with a wrench-head, a shaft $b$, slightly longer than the thickness of a washer and the part passed through for attachment, and a further shaft $b'$ of lesser diameter threaded on all or part of its length. Where the larger-diameter shaft ends and the smaller begins there is a shoulder $b^2$. The shaft $b$ is surrounded by bushing $b^3$, of a resilient material, preferably of somewhat less diameter than the washer $b^4$, which the shaft $b$ pierces and which fits against the wrench-head. This washer may be dispensed with by increasing the size of the wrench-head. A suitable number of these studs and attendant parts passing through suitable-size openings bored through the driven gear C are threaded into the table A and tightened down to the shoulder $b^2$ and hold these parts in secure but yielding relations to each other, for as the shaft $b$ of the stud-bolt B is longer than the thickness of the gear C where it is pierced by the stud-bolt the gear C is not clamped to the table A, but may move slightly when sufficient resistance is applied to the table A or something thereon, as work being tooled, to compress the bushing $b^3$ and "ease off" against shock, securing smooth and uniform action of the table.

The driving-gear D meshes with the driven gear C and attendant parts and imparts motion to the table and work affixed thereto in the usual manner.

Fig. 4 shows my improvement applied to a hub-gear, and Fig. 5 applied to the driven toothed rack C and bed A, of the planer.

The bushing $b^3$ may be made of any resilient material—as vulcanized fiber, rubber, and the like—and is made, preferably, to a driving fit with shafts $b$ and the holes bored in the gear C.

I claim as my invention and desire to secure by Letters Patent of the United States—

1. A driven member composed of two concentric parts, a bolt loosely piercing one and fastened rigidly into the other, said bolt having one portion of its shaft enlarged and slightly longer than the thickness of the pierced member and a resilient bushing surrounding said enlarged portion, and such bolt carrying a member larger than the bolt-hole in the member pierced, substantially as set forth.

2. The combination with two parts of a power transmission, of stud-bolts passing through one of said parts and into the other part, said part through which the bolts pass being pierced with openings of greater diameter than the bolts, resilient bushings fitting said openings and receiving said bolts, and means carried by the bolts and fitting against the bushing and having a diameter in excess thereof.

In testimony whereof I have hereunto set my hand in presence of two subscribing witnesses.

EDWARD A. MULLER.

Witnesses:
 BURTON O. GREGG,
 JOSEPH R. GARDNER.